May 17, 1932.   J. K. LUND   1,858,454
MIXING VALVE
Filed June 14, 1930
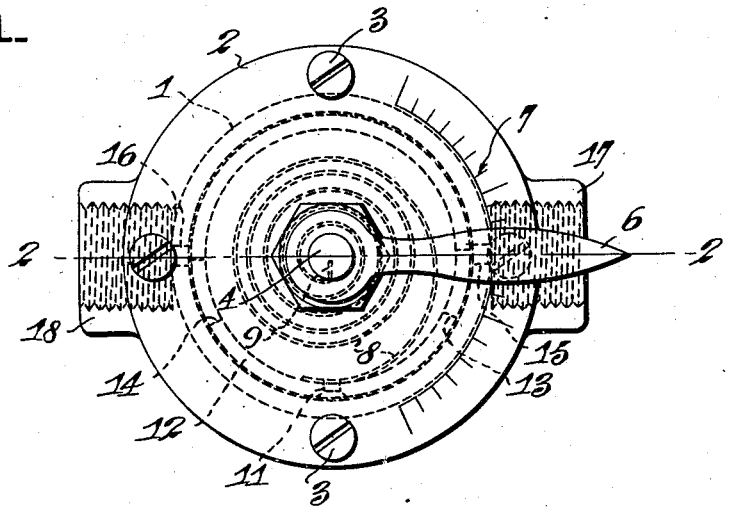
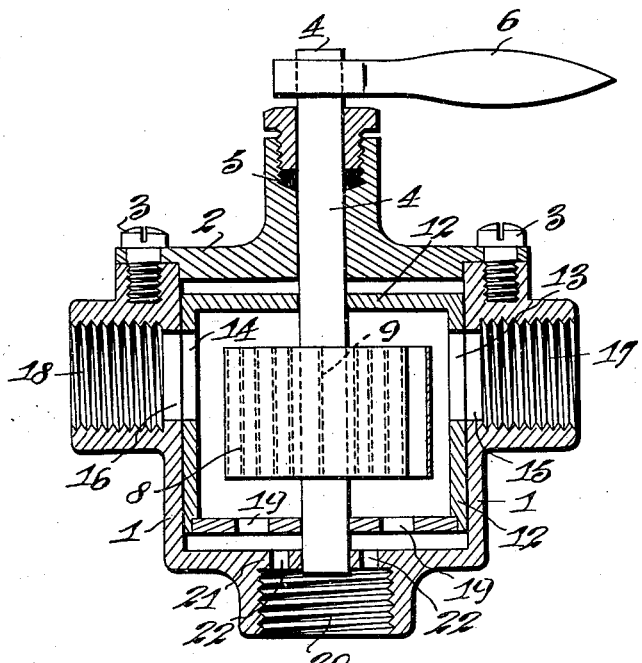
Inventor
James K. Lund
By Parker Carter
Attorney Patented May 17, 1932

1,858,454

UNITED STATES PATENT OFFICE

JAMES K. LUND, OF CHICAGO, ILLINOIS, ASSIGNOR TO DOLE VALVE COMPANY, OF CHICAGO, ILLINOIS, A CORPORATION OF ILLINOIS

MIXING VALVE

Application filed June 14, 1930. Serial No. 461,179.

This invention relates to mixing valves and has for its object to provide a new and improved device of this description.

The invention has as its further object to provide a valve by means of which two fluids of different temperatures can be mixed so as to provide a common mixture of the desired temperature. The invention has the further object to provide a device of this type whereby the mixed fluid is maintained at the desired temperature automatically. The invention has other objects which are more particularly pointed out in the accompanying description.

Referring now to the drawings, Fig. 1 is a plan view of one form of the device embodying the invention;

Fig. 2 is a sectional view taken on line 2—2 of Fig. 1.

Like numerals refer to like parts throughout the several figures.

Referring now to the drawings, I provide a construction consisting of a casing 1 provided with a removable cover 2 held in place by the removable fastening devices 3. A rocking shaft 4 passes through the casing and has one end journaled in the cover 2 and the other end in the wall of the casing as clearly shown in Fig. 2. A stuffing box 5 is also provided for the shaft at the end where it projects beyond the casing. Connected with the shaft 4 is a control handle 6 by means of which the shaft may be moved to any desired position. The cover of the casing is preferably provided with a series of graduations 7, and these graduations may be designated in any manner desired as, for example, the temperature it is desired to secure for the mixed fluid, so that the control handle may be moved by anyone to secure the desired temperature.

A thermostatic device 8 made up in any desired manner, preferably in the form of a coil as indicated in Figs. 1 and 2, has its inner end 9 connected to shaft 4. This thermostatic device may consist of a coil of thermostatic metal, that is, a sheet or coil made up of two different metals which expand differently for the same temperatures. The other end of this thermostatic device is connected at 11 with the movable control member 12, which consists of a hollow chamber provided with the ports 13 and 14. The casing is also provided with the ports 15 and 16 opposite the inlets for the hot and cold water. The casing is provided with the hollow, internally threaded projections 17 and 18, which are connected to the pipes through which the hot and cold water is admitted. The hot water, for example, may be admitted through the part 17 and the cold water through the part 18. The control member 12 is provided with one or more discharge ports 19 through which the mixed fluid or water passes into the discharge pipe connected with the hollow threaded projection 20 on the casing 1.

In order to provide a proper bearing for the shaft 4, the casing is provided with a wall 21 which has an opening for the shaft 4, and which has one or more openings 22 through which the mixed liquid or fluid may pass to the discharge pipe. It will be noted that as the control member 12 is rocked, since the ports 13 and 14 thereof are opposite the ports 15 and 16 in the casing, this rocking will vary the size of the inlet into the control member and may be moved to entirely close this inlet. In the operation of the device, however, the control member 12 will be moved so that the inlet into the control member for the cold and hot water is the proper size to secure the desired temperature of the mixed water, and this is done initially by moving the handle 6. The handle is then held in this adjusted position.

The use and operation of my invention is as follows:

When the device is in use, the parts 17 and 18 are connected to the hot and cold water pipes leading to the hot and cold water supply, and the part 20 is connected to the discharge pipe which leads to the point where the mixed water is to be used. The control member is then moved to the proper position by means of the handle 6 to secure the proper temperature of the mixed water. The water then passes through the ports 14 and 16 and 13 and 15 into the interior of the control member, so as to be in contact with the thermostat 8, and is mixed in the chamber on the interior of the control member, and then passes out through the openings 19 and 22 into the discharge pipe. The thermostatic device is arranged so as to maintain this temperature. If, during this operation, the cold or hot water should vary, the thermostatic device 8 moves the control member so as to vary the size of the admission ports into said control member.

If the water is too cold, for example, the control member is moved to decrease the cold water admission and increase the hot water admission. Whereas, if the water is too hot, the control member is automatically moved to decrease the amount of hot water and increase the amount of cold water. It will thus be seen that by means of this device the cold and hot water are mixed so as to secure a given temperature for the mixture, and this given temperature is automatically maintained so that the water which passes out through the part 20 and into the discharge pipe is maintained at a uniform temperature.

I claim:

1. A mixing valve for mixing fluids of different temperatures, comprising a casing having separate inlets for the fluids of different temperature, and an outlet for the mixed fluids, a hollow rotatably mounted control member in the casing having separated ports opposed to the admission ports in the casing, a thermostat within said hollow control member and connected therewith so as to move the hollow control member to vary the cross-sectional area of the admission ports so as to maintain a uniform temperature of the water in the control member, and a connection between the interior of said control member and the outlet of said casing.

2. A mixing valve comprising a casing, a rock shaft projecting into said casing, a hollow rotary control member surrounding said shaft and free to move with relation thereto, a thermostat connecting said shaft and said control member, the casing having separated inlet ports for the fluids of different temperatures, said control member also having separated admission ports opposed to the admission ports in the casing, the thermostat acting to move the control member to vary the cross-sectional area of said ports, to maintain the mixed fluid of a uniform temperature.

3. A mixing valve comprising a casing, a rock shaft projecting into said casing, a hollow control member surrounding said shaft and free to move with relation thereto, a thermostat connecting said shaft and said control member, the casing having inlet ports for the fluids of different temperatures, said control member also having admission ports on its periphery opposed to the admission ports in the casing, said control member also having a port in its end, an outlet with which said port communicates, the thermostat acting to move the control member to vary the cross-sectional area of said ports, to maintain the mixed fluid of a uniform temperature, a controlling handle on the exterior of the casing for adjusting the device.

4. A mixing device, comprising two hollow casings, an outer and inner casing one rotatably mounted within the other, each casing having two separated inlet ports, the inlet ports of the inner casing registering with the inlet ports of the outer casing, and means responsive to variations in temperature in the inner casing for rotating the two casings relatively to vary the cross-sectional area of the registering portions of said ports, the casings being provided with a common discharge.

Signed at Chicago, county of Cook, and State of Illinois, this 5th day of June, 1930.

JAMES K. LUND.